(12) United States Patent
Wang

(10) Patent No.: US 8,437,737 B2
(45) Date of Patent: May 7, 2013

(54) DEVICE AND METHOD FOR RECHARGING SIM CARD

(75) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/313,024

(22) Filed: Dec. 7, 2011

(65) Prior Publication Data

US 2013/0005300 A1    Jan. 3, 2013

(51) Int. Cl.
*H04M 11/00* (2006.01)

(52) U.S. Cl.
USPC ........... 455/407; 455/405; 455/406; 455/408; 455/558; 455/432.3

(58) Field of Classification Search .................. 455/405, 455/406, 407, 408, 558, 432.3
See application file for complete search history.

(56) References Cited

U.S. PATENT DOCUMENTS

| | | | | |
|---|---|---|---|---|
| 2008/0119162 A1* | 5/2008 | Sivalingam et al. | .......... | 455/408 |
| 2008/0125080 A1* | 5/2008 | Phillips | .......... | 455/405 |
| 2008/0261558 A1* | 10/2008 | Enriquez | .......... | 455/406 |
| 2008/0281737 A1* | 11/2008 | Fajardo | .......... | 705/35 |
| 2010/0029200 A1* | 2/2010 | Varriale et al. | .......... | 455/41.1 |

* cited by examiner

*Primary Examiner* — Kamran Afshar
*Assistant Examiner* — Khalid Shaheed
(74) *Attorney, Agent, or Firm* — Altis Law Group, Inc.

(57) ABSTRACT

A method for recharging a first SIM card through a mobile phone using a second SIM card is described. The method includes: receiving identifying information; generating a first short message containing the identifying information; receiving recharging information containing a phone number associated with the second SIM card and charge amount; generating a second short message containing the recharging information; and sending the first short message and the second short message to a mobile service provider, such that the mobile service device can accordingly recharge the first SIM card.

6 Claims, 3 Drawing Sheets

DEVICE AND METHOD FOR RECHARGING SIM CARD

BACKGROUND

1. Technical Field

The present disclosure relates to a device and a method for recharging a Subscriber Identity Module card (SIM card).

2. Description of Related Art

SIM card users can recharge their SIM cards by purchasing a prepaid card in particular stores or through the Internet. However, the above-mentioned recharging means are not convenient for users, since the particular stores may not be located around the user, while the Internet may not be accessible every time and everywhere. Thus, a way to recharge SIM cards without such limitations is required.

BRIEF DESCRIPTION OF THE DRAWINGS

The components in the drawings are not necessarily drawn to scale, the emphasis instead being placed upon clearly illustrating the principles of device and method for recharging SIM card. Moreover, in the drawings, like reference numerals designate corresponding parts throughout the several views.

DETAILED DESCRIPTION

Figure 1:
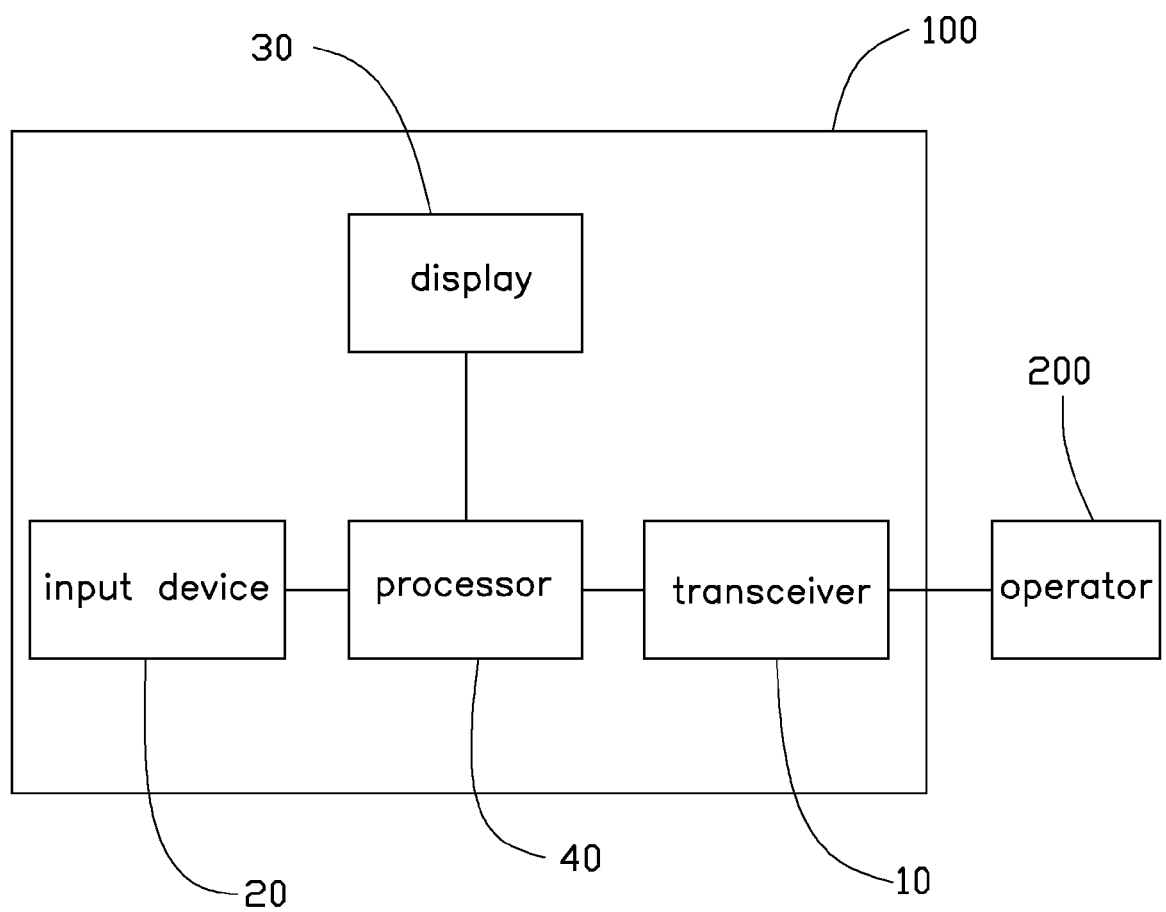
FIG. 1 is a block diagram of a mobile device for recharging a SIM card, in accordance with an exemplary embodiment of the present disclosure.

FIG. 1 shows a mobile device, which is for implementing a method for recharging a first subscriber identity module card (SIM card), according to an exemplary embodiment of the present disclosure. The method is for pre-paying or making additional prepayments (recharging) for the first SIM card. The mobile device may be a mobile phone 100, including a communicating module (transceiver) 10, an input device 20, a display module (display) 30 and a processor 40. The transceiver 10, the input device 20 and the display 30 are electrically connected to the processor 40. The transceiver 10 is capable of communicating with a mobile service provider, which may be an operator 200. It is essential that the following mentioned SIM cards are all issued by the operator 200.

Figure 2:
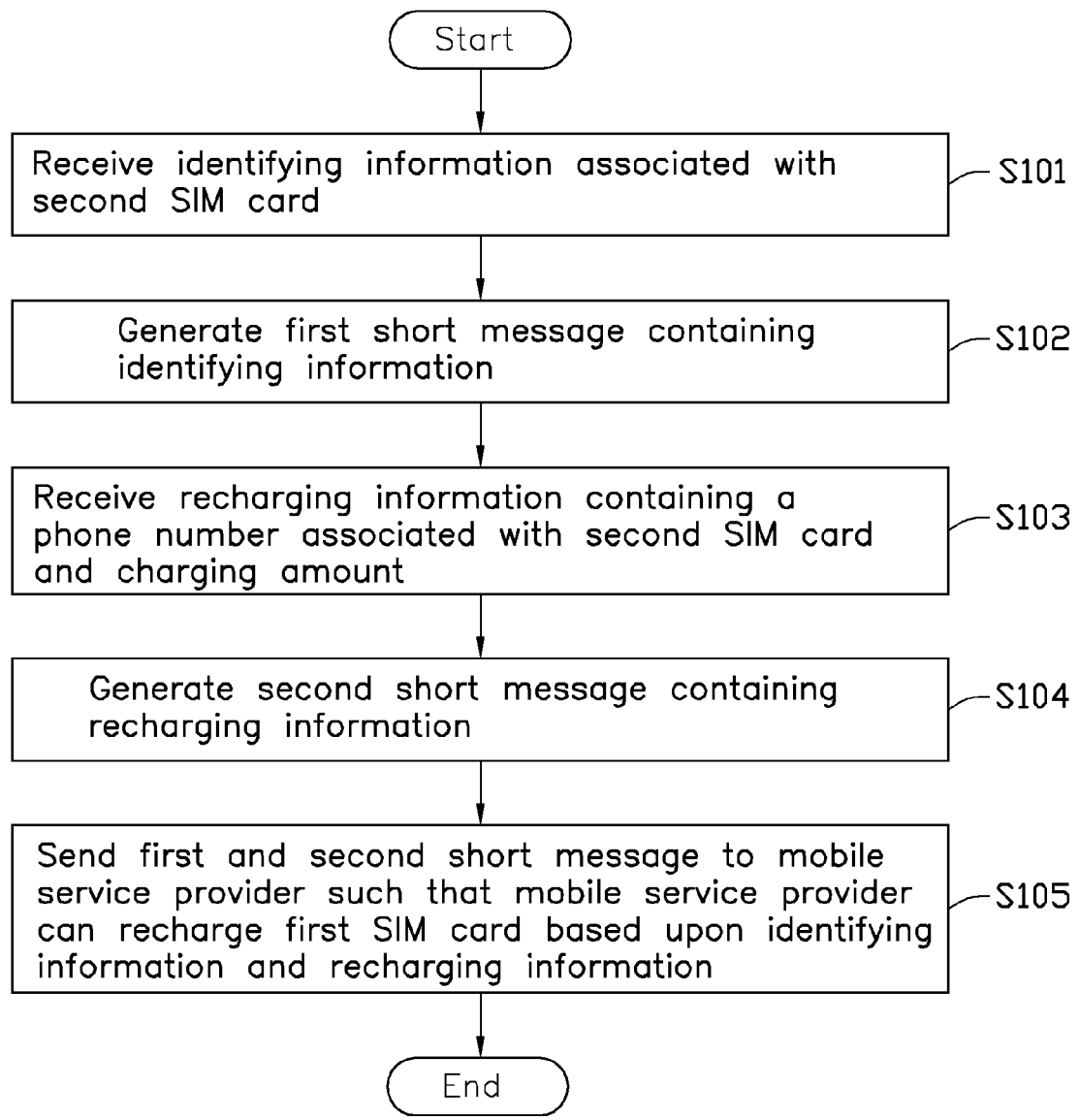
FIG. 2 is a flowchart illustrating a method for recharging a SIM card, in accordance with the exemplary embodiment of the present disclosure.

FIG. 2 is a flowchart of the method according to the exemplary embodiment. To recharge the first SIM card (the SIM card to be recharged), a user inputs identifying information associated with a second SIM card (the SIM card providing balance for recharging) to the mobile phone 100 (S101), via a verifying interface provided by the display 30. The processor 40 of the mobile phone 100 accordingly generates a first short message containing the identifying information (S102).

The user sequentially inputs recharging information to the mobile phone 100 via a recharging interface provided by the display 30 (S103), wherein the recharging information containing a phone number associated with the second SIM card and charging amount for the first SIM card.

Figure 3:
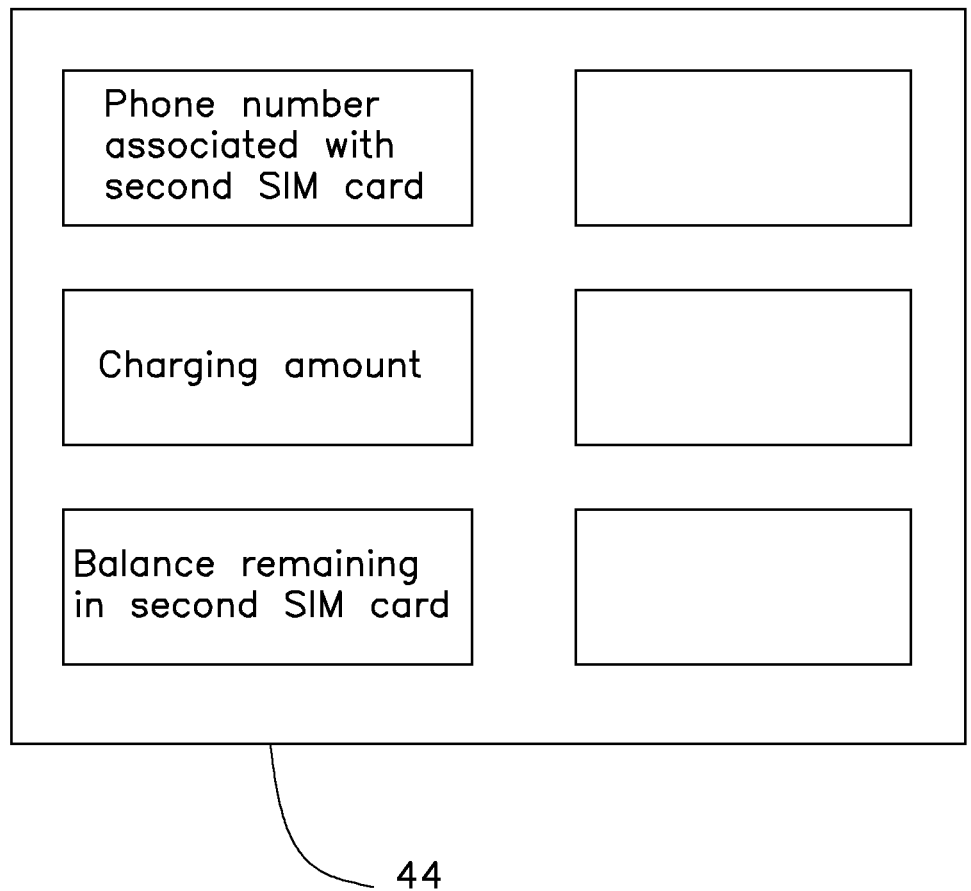
FIG. 3 is a schematic view of a recharging interface displayed on a display of the mobile device.

FIG. 3 shows the recharging interface, while it is displayed on the display 30 of the mobile phone 100. A recharging interface 44 provides several blanks for the user to fill in, wherein the blanks include the phone number associated with the second SIM card and charging amount for the first SIM card. Preferably, a balance remaining in the second SIM card is also provided within the recharging interface 44.

Referring to FIG. 2, after the step S103, the processor 40 of the mobile phone 100 accordingly generates a second short message containing the recharging information (S104). The transceiver 10 of the mobile phone 100 sends the first short message and the second short message to the operator 200 such that the operator 200 can recharge the first SIM card based upon the identifying information and the recharging information (S105).

In a first embodiment of the present disclosure, the first SIM card is installed on the mobile phone 100, and the identifying information is a personal identification number (PIN) associated with the second SIM card. After the step S105, as the first and the second short messages have been sent to the operator 200, the operator 200 determines if the phone number in the recharging information matches with the PIN, and transfers the charging amount from the balance in the second SIM card to the first SIM card if the phone number matches the PIN.

In a second embodiment of the present disclosure, it is the second SIM card being installed on the mobile phone 100, and the identifying information is the phone number associated with the first SIM card. After the step S105, the operator 200 determines if the phone number in the recharging information matches with a phone number sending the first short message and the second short message. If yes, the operator 200 transfers the charging amount from the balance in the second SIM card to the first SIM card.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A method for recharging a first subscriber identity module card (SIM card) through a mobile device using a second SIM card, the first SIM card installed on the mobile device, the method comprising:

receiving identifying information associated with the second SIM card using the mobile device;

generating a first short message containing the identifying information;

receiving recharging information using the mobile device, the recharging information containing a phone number associated with the second SIM card, charging amount, and a balance remaining in the second SIM card;

generating a second short message containing the recharging information; and sending the first short message and the second short message to a mobile service provider using the mobile device such that the mobile service provider recharges the first SIM card based upon the identifying information and the recharging information.

2. The method according to claim 1, wherein the identifying information is a personal identification number (PIN) associated with the second SIM card, whereby the mobile service provider transfers the charging amount from the balance in the second SIM card to the first SIM card if the phone number in the recharging information matches with the PIN.

3. A method for recharging a first subscriber identity module card (SIM card) through a mobile device using a second SIM card, the second SIM card installed on the mobile device, the method comprising:

receiving identifying information associated with the first SIM card using the mobile device;

generating a first short message containing the identifying information;

receiving recharging information using the mobile device, the recharging information containing a phone number associated with the second SIM card and, charging amount, and a balance remaining in the second SIM card;

generating a second short message containing the recharging information; and sending the first short message and the second short message to a mobile service provider using the mobile device such that the mobile service provider recharges the first SIM card based upon the identifying information and the recharging information.

4. The method according to claim 3, wherein the identifying information is the phone number associated with the first SIM card, whereby the mobile service provider transfers the charging amount from the balance of the second SIM card to the first SIM card if the phone number in the recharging information matches with a phone number sending the first short message and the second short message.

5. A mobile device for recharging a first subscriber identity module card (SIM card) using a second SIM card, the mobile device comprising:

a display module for providing a verifying interface for allowing a user to input identifying information associated with the first SIM card; and a recharging interface for allowing a user to input recharging information, the recharging information containing a phone number associated with the first SIM card and, charging amount, and a balance remaining in the second SIM card;

a processor for generating a first short message containing the identifying information;

and generating a second short message containing the recharging information; and a communicating module for sending the first short message and the second short message to a mobile service provider such that the mobile service provider recharges the first SIM card based upon the identifying information and the recharging information.

6. The mobile device according to claim 5, wherein the identifying information is a personal identification number (PIN) associated with the second SIM card, whereby the mobile service provider transfers the charging amount from the balance in the second SIM card to the first SIM card if the phone number in the recharging information matches with the PIN.

* * * * *

UNITED STATES PATENT AND TRADEMARK OFFICE
CERTIFICATE OF CORRECTION

PATENT NO. : 8,437,737 B2  Page 1 of 1
APPLICATION NO. : 13/313024
DATED : May 7, 2013
INVENTOR(S) : Peng Wang It is certified that error appears in the above-identified patent and that said Letters Patent is hereby corrected as shown below:

On the title page insert the following:

--(30)  Foreign Application Priority Data

June 30, 2011  (CN) ..........................2011 1 0182281--

Signed and Sealed this
Twenty-sixth Day of November, 2013

Margaret A. Focarino
*Commissioner for Patents of the United States Patent and Trademark Office*